US012672116B2

(12) United States Patent　　　(10) Patent No.:　　US 12,672,116 B2

Atawia　　　　　　　　　　　　　　(45) Date of Patent:　　Jun. 30, 2026

(54) MULTI-BAND SPECTRUM ALLOCATION FOR CELLULAR NETWORKS

(71) Applicant: Dell Products, L.P., Round Rock, TX (US)

(72) Inventor: Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 1073 days.

(21) Appl. No.: 17/664,691

(22) Filed: May 24, 2022

(65) Prior Publication Data

US 2023/0388985 A1　　Nov. 30, 2023

(51) Int. Cl.
| | |
|---|---|
| *H04W 72/0453* | (2023.01) |
| *H04W 24/08* | (2009.01) |
| *H04W 28/02* | (2009.01) |
| *H04W 72/543* | (2023.01) |

(52) U.S. Cl.
CPC ....... *H04W 72/0453* (2013.01); *H04W 24/08* (2013.01); *H04W 28/0268* (2013.01); *H04W 72/543* (2023.01)

(58) Field of Classification Search
None
See application file for complete search history.

(56) References Cited

U.S. PATENT DOCUMENTS

| | | | | |
|---|---|---|---|---|
| 2013/0279356 | A1* | 10/2013 | Park | H04B 7/06952 |
| | | | | 370/252 |
| 2016/0330743 | A1* | 11/2016 | Das | H04W 4/24 |

| | | | | |
|---|---|---|---|---|
| 2018/0049206 | A1* | 2/2018 | Yerramalli | H04W 16/14 |
| 2019/0104416 | A1* | 4/2019 | Yerramalli | H04W 72/51 |
| 2020/0067645 | A1* | 2/2020 | Zhang | H04W 72/56 |
| 2020/0374839 | A1 | 11/2020 | Novlan et al. | |
| 2022/0272568 | A1 | 8/2022 | Lee et al. | |
| 2022/0353744 | A1 | 11/2022 | Shen et al. | |
| 2022/0386172 | A1 | 12/2022 | Xie et al. | |
| 2023/0139778 | A1* | 5/2023 | Wang | H04L 1/0067 |
| | | | | 370/329 |

OTHER PUBLICATIONS

"5G; Service requirements for cyber-physical control applications in vertical domains," Technical Specification, 3GPP TS 22.104 version 16.5.0 Release 16, Sep. 2020, 58 pages.
Notice of Allowance mailed Sep. 12, 2024 for U.S. Appl. No. 17/804,351, 62 pages.

\* cited by examiner

*Primary Examiner* — Srinivasa R Reddivalam

(74) *Attorney, Agent, or Firm* — Amin, Turocy & Watson, LLP

(57)　　　　　　ABSTRACT

The described technology is generally directed towards multi-band spectrum allocation for cellular networks. A first radio frequency band can be allocated for dedicated use at a first cellular communication network, while a second radio frequency band can be allocated for shared use via the first cellular communication network and a second cellular communication network. The first cellular communication network can comprise a private network, while the second cellular communication network can comprise a public network. In order to select the first and second radio frequency bands, multiple radio frequency bands can be evaluated for carrier characteristics such as quality of service and coverage area.

20 Claims, 10 Drawing Sheets

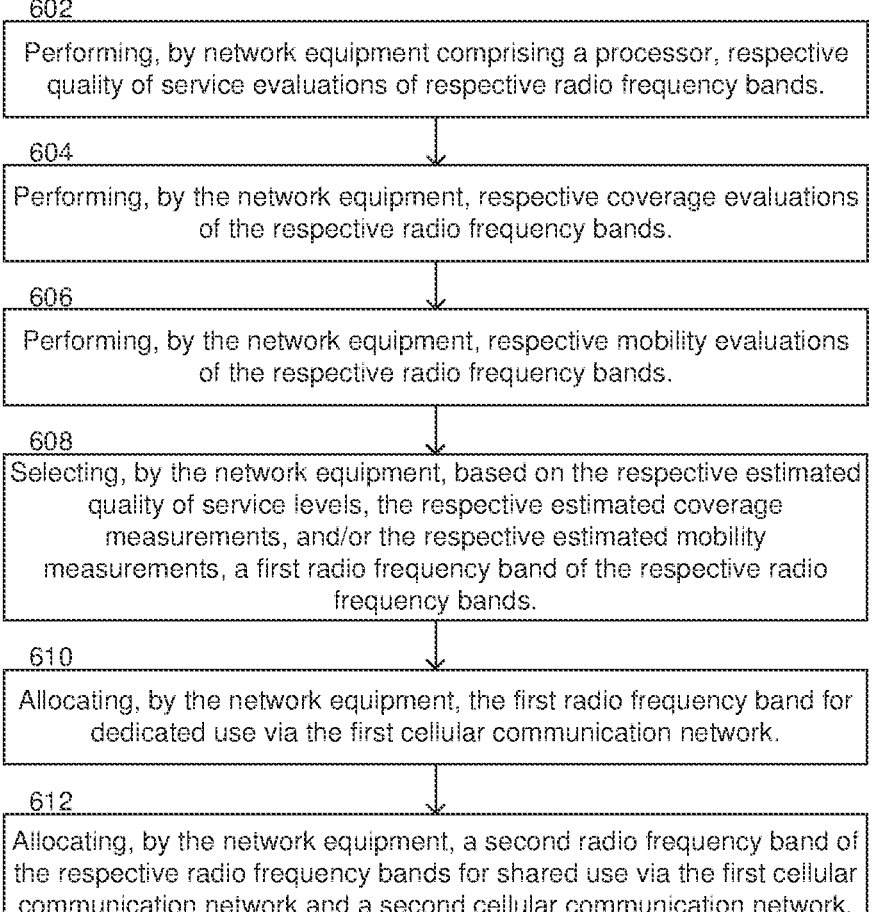

602

Performing, by network equipment comprising a processor, respective quality of service evaluations of respective radio frequency bands.

604

Performing, by the network equipment, respective coverage evaluations of the respective radio frequency bands.

606

Performing, by the network equipment, respective mobility evaluations of the respective radio frequency bands.

608

Selecting, by the network equipment, based on the respective estimated quality of service levels, the respective estimated coverage measurements, and/or the respective estimated mobility measurements, a first radio frequency band of the respective radio frequency bands.

610

Allocating, by the network equipment, the first radio frequency band for dedicated use via the first cellular communication network.

612

Allocating, by the network equipment, a second radio frequency band of the respective radio frequency bands for shared use via the first cellular communication network and a second cellular communication network.

FIG. 6

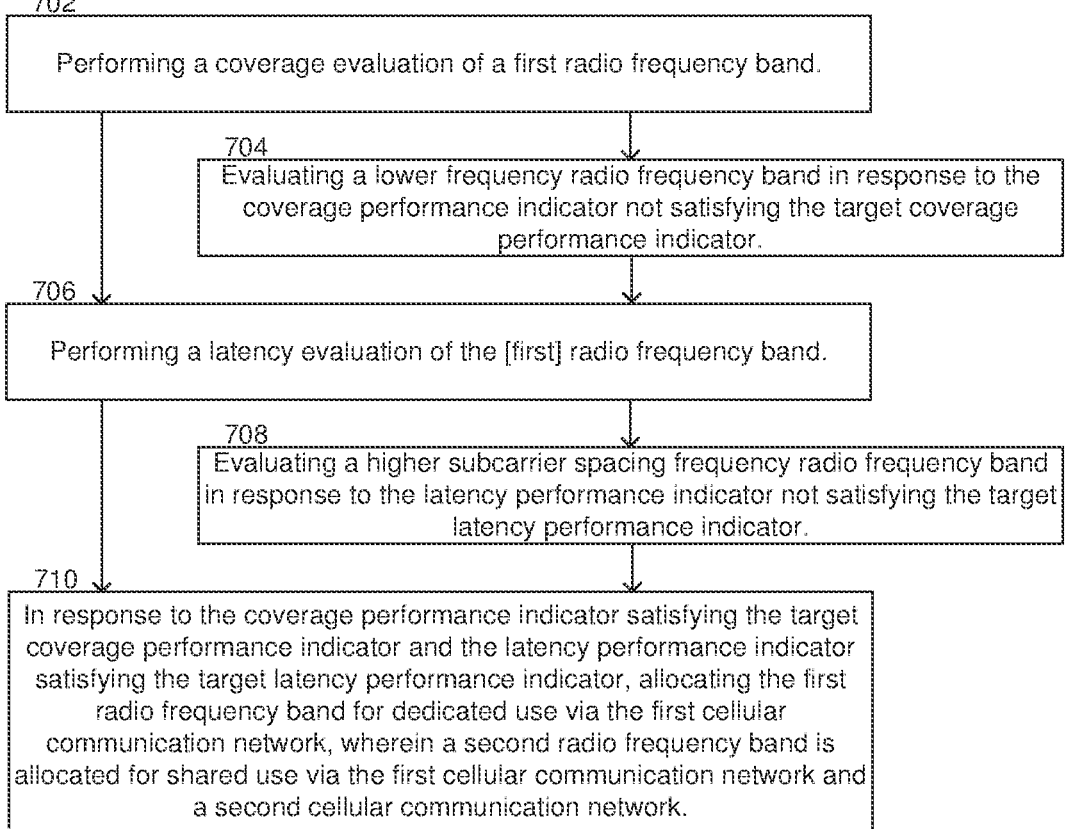

702

Performing a coverage evaluation of a first radio frequency band.

704

Evaluating a lower frequency radio frequency band in response to the coverage performance indicator not satisfying the target coverage performance indicator.

706

Performing a latency evaluation of the [first] radio frequency band.

708

Evaluating a higher subcarrier spacing frequency radio frequency band in response to the latency performance indicator not satisfying the target latency performance indicator.

710

In response to the coverage performance indicator satisfying the target coverage performance indicator and the latency performance indicator satisfying the target latency performance indicator, allocating the first radio frequency band for dedicated use via the first cellular communication network, wherein a second radio frequency band is allocated for shared use via the first cellular communication network and a second cellular communication network.

FIG. 7

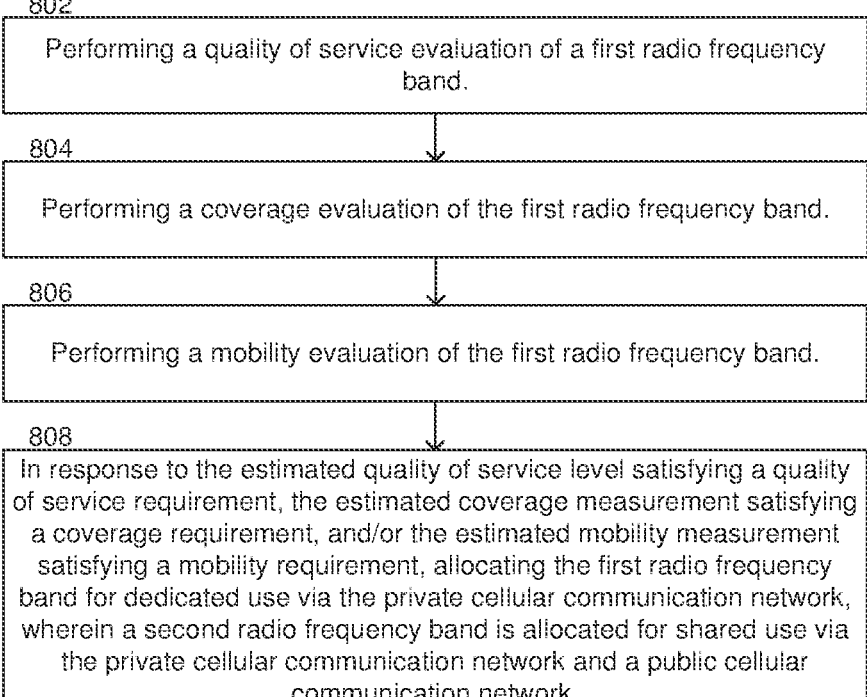

802
Performing a quality of service evaluation of a first radio frequency band.

804
Performing a coverage evaluation of the first radio frequency band.

806
Performing a mobility evaluation of the first radio frequency band.

808
In response to the estimated quality of service level satisfying a quality of service requirement, the estimated coverage measurement satisfying a coverage requirement, and/or the estimated mobility measurement satisfying a mobility requirement, allocating the first radio frequency band for dedicated use via the private cellular communication network, wherein a second radio frequency band is allocated for shared use via the private cellular communication network and a public cellular communication network.

FIG. 8

MULTI-BAND SPECTRUM ALLOCATION FOR CELLULAR NETWORKS

TECHNICAL FIELD

The subject application generally relates to cellular networks, for example, to selection and allocation of radio frequency bands for use by cellular networks, and related embodiments.

BACKGROUND

Cellular networks can serve different applications with different performance specifications. For example, some applications may specify a high data rate, others may specify high-speed connectivity for users, while still others may specify uniform coverage in large service areas.

Meeting such different application performance specifications can be challenging, in particular because cellular network frequency bands that are beneficial to one performance specification may prove detrimental to other performance specifications. For example, in order to provide a high data rate, cellular networks can employ carrier frequency bands with large bandwidths, which may exist in the high-band frequency range. However, the higher frequency bands suffer from larger pathloss than lower frequency bands, and the higher frequency bands thus provide smaller coverage areas, which is detrimental for applications having large service area and/or high mobility specifications. On the other hand, low-band carriers with larger coverage areas typically have smaller bandwidths that do not satisfy high data rate specifications.

Existing approaches to cellular network spectrum allocation primarily assume the use of a single band in the network. The single band can be either shared or dedicated. Existing approaches may furthermore focus only on network load to determine the carrier bandwidth needed for spectrum allocation. These approaches can result in violating one or more of the diverse performance requirements presented by multiple applications.

In an example, a factory automation use case may employ two applications: mobile robots and process monitoring. Mobile robots can require high data rates within a small service area, and thus a mid- or high-band carrier may be optimal for the mobile robots due to its larger bandwidth. Despite its larger path loss, the resultant coverage may be suitable for the small service area. On the other hand, process monitoring can span a large coverage area and thus a low-band carrier may be the optimal choice for the process monitoring due to its low pathloss, despite its lower channel capacity. Thus, deploying only a single band can result in violating the specifications of either the mobile robots or the process monitoring.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 6 is a flow diagram of a first example, non-limiting computer implemented method for selecting multiple radio frequency bands for use by a cellular network, in accordance with one or more embodiments described herein.

FIG. 7 is a flow diagram of a second example, non-limiting computer implemented method for selecting multiple radio frequency bands for use by a cellular network, in accordance with one or more embodiments described herein.

FIG. 8 is a flow diagram of a third example, non-limiting computer implemented method for selecting multiple radio frequency bands for use by a cellular network, in accordance with one or more embodiments described herein.

DETAILED DESCRIPTION

Figure 1:
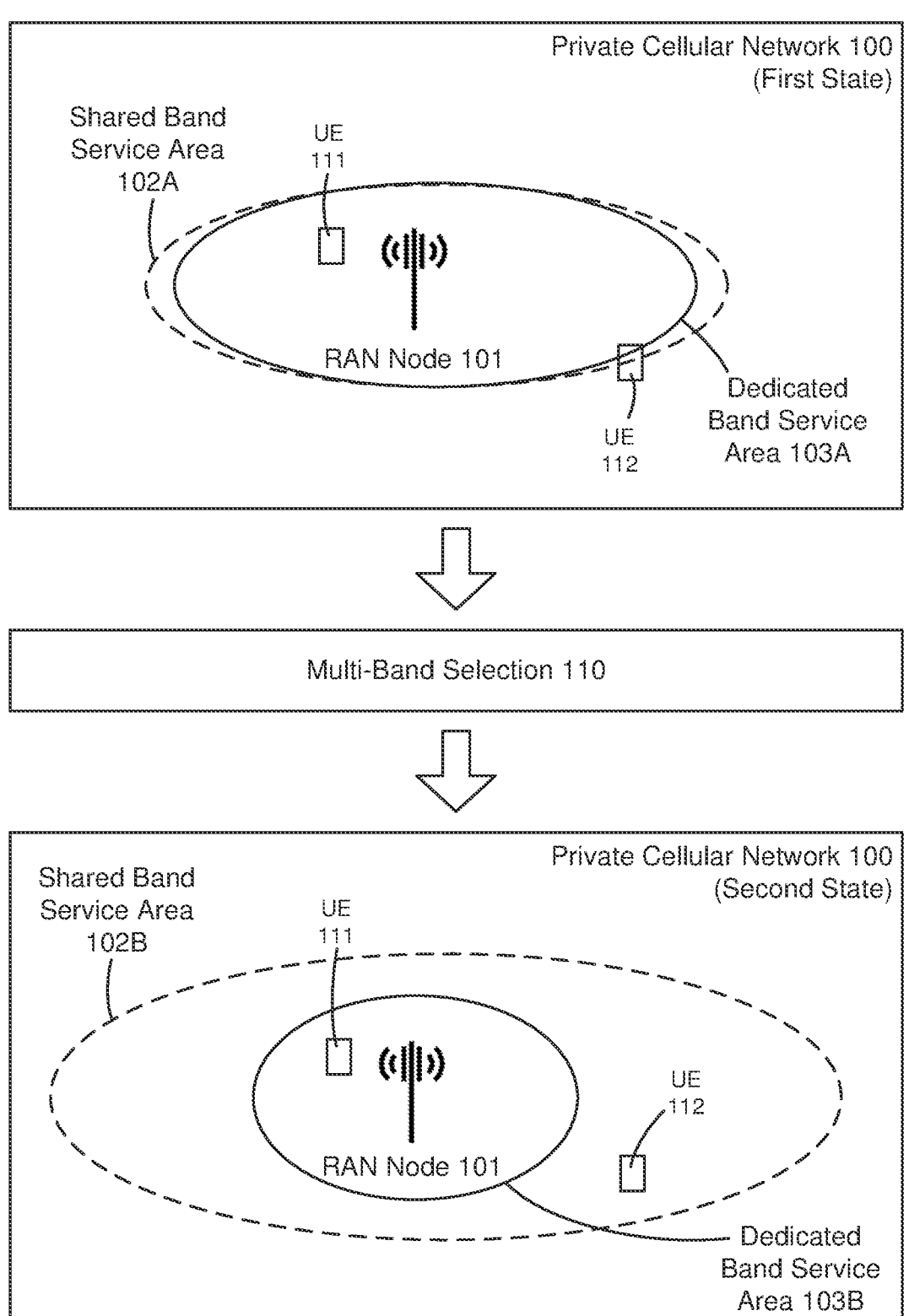
FIG. 1 is a state diagram illustrating example states of a network before and after frequency band selections, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed towards multi-band spectrum allocation for cellular networks. A first radio frequency band can be allocated for dedicated use at a first cellular communication network, while a second radio frequency band can be allocated for shared use via the first cellular communication network and a second cellular communication network. The first cellular communication network can comprise a private network, while the second cellular communication network can comprise a public network. In order to select the first and second radio frequency bands, multiple radio frequency bands can be evaluated for carrier characteristics such as quality of service and coverage area. Further aspects and embodiments of this disclosure are described in detail below.

FIG. 1 is a state diagram illustrating example states of a network before and after frequency band selections, in accordance with one or more embodiments described herein. FIG. 1 includes a private cellular network 100 in a first state prior to a multi-band selection 110 to select radio frequency bands for use by the private cellular network 100, and the private cellular network 100 in a second state, after the private cellular network 100 adopts use of the radio frequency bands selected according to multi-band selection 110. The private cellular network 100 includes an example radio access network (RAN) node 101, e.g., a RAN node that is capable of supporting use of multiple radio frequency bands. Example user equipment (UE) 111 and UE 112 can be served by the RAN node 101.

In the first state, the RAN node 101 can use a first dedicated band, which can be dedicated for use by the private cellular network 100, and which can have a dedicated band service area 103A as well as other characteristics and properties, such as a quality of service (QoS), latency, data rate, and other properties associated with the first dedicated band. The RAN node 101 can furthermore use a first shared band, which can be shared with another RAN node, e.g., a RAN node of a public network. The public network is not illustrated in FIG. 1. The first shared band can have a shared band service area 102A as well as other characteristics and properties, such as a QoS, latency, data rate, and other properties associated with the first shared band. In the illustrated example, both the dedicated band service area 103A and the shared band service area 102A are larger than necessary to support communications with UE 111, while neither the dedicated band service area 103A nor the shared band service area 102A are large enough to guarantee support for communications with UE 112.

Figure 2:
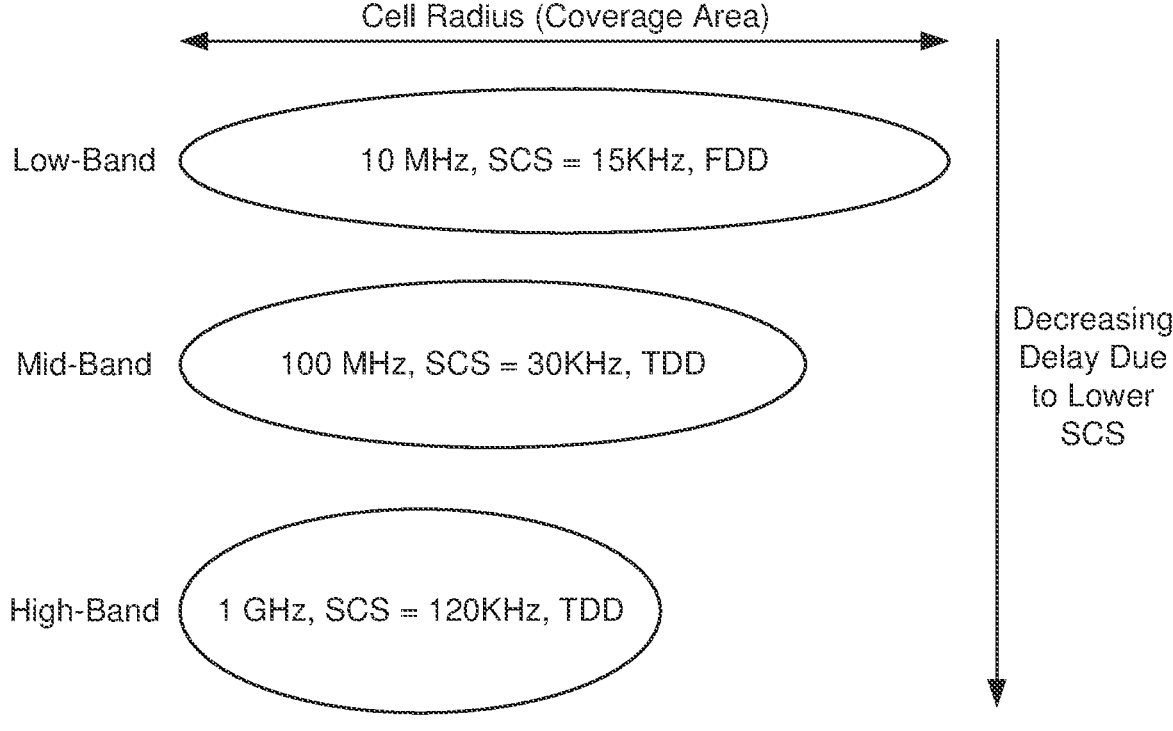
FIG. 2 illustrates example capabilities of frequency bands in low-band, mid-band, and high-band ranges, in accordance with one or more embodiments described herein.

In some embodiments according to this disclosure, techniques are disclosed to perform the multi-band selection 110 for a private cellular network 100 in a first state, such as the example first state illustrated in FIG. 1, in order to transition the private cellular network 100 to a second state, such as the example second state illustrated in FIG. 2. The second state can employ different radio frequency bands to achieve better overall support for communications with the UEs 111, 112.

In the second state, the RAN node 101 can use a second dedicated band, which can be dedicated for use by the private cellular network 100, and which can have a dedicated band service area 103B as well as other properties, such as QoS, latency, data rate, and other properties associated with the second dedicated band. It can be observed that the dedicated band service area 103B is smaller than the dedicated band service area 103A. The second dedicated band can optionally comprise, e.g., a high band with smaller coverage area than the first dedicated band, and with the advantages of better QoS, lower delay, etc., as illustrated in connection with high bands shown in FIG. 2.

In the second state, the RAN node 101 can furthermore use a second shared band, which can be shared with another RAN node, e.g., the same other RAN node as shares a band with the private network 100 in the first state, as described above. The second shared band can have a shared band service area 102B as well as other properties, such as QoS, latency, data rate, and other properties associated with the second shared band. In the illustrated example, the shared band service area 102B is larger than the shared band service area 102A, and the shared band service area 102B is large enough to support communication with UE 112. The second shared band can optionally comprise, e.g., a low band with larger coverage area than the first shared band, i.e., a low band such as illustrated in FIG. 2.

Private 5G networks, such as private cellular network 100, can provide authorized users with wireless connectivity at a guaranteed service level. However, network performance depends on the ability of activated carriers (i.e., frequency bands) to meet coverage and data rate requirements. Embodiments of this disclosure can apply methods for selecting optimal carriers for private networks, such as private cellular network 100, while considering the trade-off between coverage and capacity of each carrier in multi-band 5G networks. Methods can consider carrier characteristics, such as center frequency and subcarrier spacing, UE capabilities, and co-existence of public networks, while evaluating different candidate carriers. Techniques disclosed herein can allow a private cellular network 100 to serve diverse requirements of multiple enterprise services and applications while reducing or minimizing spectrum acquisition cost and management overhead. Approaches disclosed herein can improve on other approaches that mainly consider single carrier deployment while primarily focusing on network load to determine a required carrier bandwidth—such other approaches overlook carrier specific challenges in the wide 5G spectrum.

FIG. 2 illustrates example capabilities of frequency bands in low-band, mid-band, and high-band ranges, in accordance with one or more embodiments described herein. FIG. 2 illustrates example cell radii (coverage areas) of low-band, mid-band, and high-band frequencies, while also arranging the frequencies in order of decreasing delay and subcarrier spacing (SCS).

Low-band frequencies can have large coverage areas, as illustrated in FIG. 2. Low-band frequencies can comprise frequencies in the 10 megahertz (MHz) range and can have SCS in the 15 kilohertz (KHz) range. Low-band frequencies can use, e.g., frequency division duplex (FDD) duplex approaches.

Mid-band frequencies can have medium coverage areas, as illustrated in FIG. 2. Mid-band frequencies can comprise frequencies in the 100 MHz range and can have SCS in the 30 KHz range. Mid-band frequencies can use, e.g., time division duplex (TDD) duplex approaches.

High-band frequencies can have relatively small coverage areas, as illustrated in FIG. 2. High-band frequencies can comprise frequencies in the 1 gigahertz (GHz) range and up, and high-band frequencies can have SCS in the 120 KHz range. High-band frequencies can use, e.g., TDD duplex approaches.

Spectrum allocation techniques according to this disclosure can consider the different capabilities of each band in the 5G spectrum, to achieve a selection of a combination of frequency bands that improve service to UEs 111, 112. In addition, service providers aiming to strike a balance between carrier acquisition cost on the one hand, and the ability to satisfy UE performance requirements on the other hand, can use techniques disclosed herein to deploy dynamic band allocation schemes to cope with time-varying network conditions.

In some embodiments, disclosed methods can allow dynamic sharing of multiple carriers between a private 5G network and a co-deployed public network. Methods can consider band characteristics, such as numerology and center frequency, to evaluate the ability of each carrier to satisfy UE or other performance specifications or requirements. Methods can furthermore consider private 5G network performance specifications or requirements such as QoS, coverage and mobility, defined in third generation partnership project (3GPP) specifications or as defined by a service provider for vertical applications. Methods can furthermore consider available downlink and uplink resources in each carrier (e.g., as a function of TDD pattern). Based on band characteristics, performance specifications or requirements, and available resources, methods can select multiple bands with complementary characteristics to serve the heterogenous requirements of a private 5G network.

Figure 3:
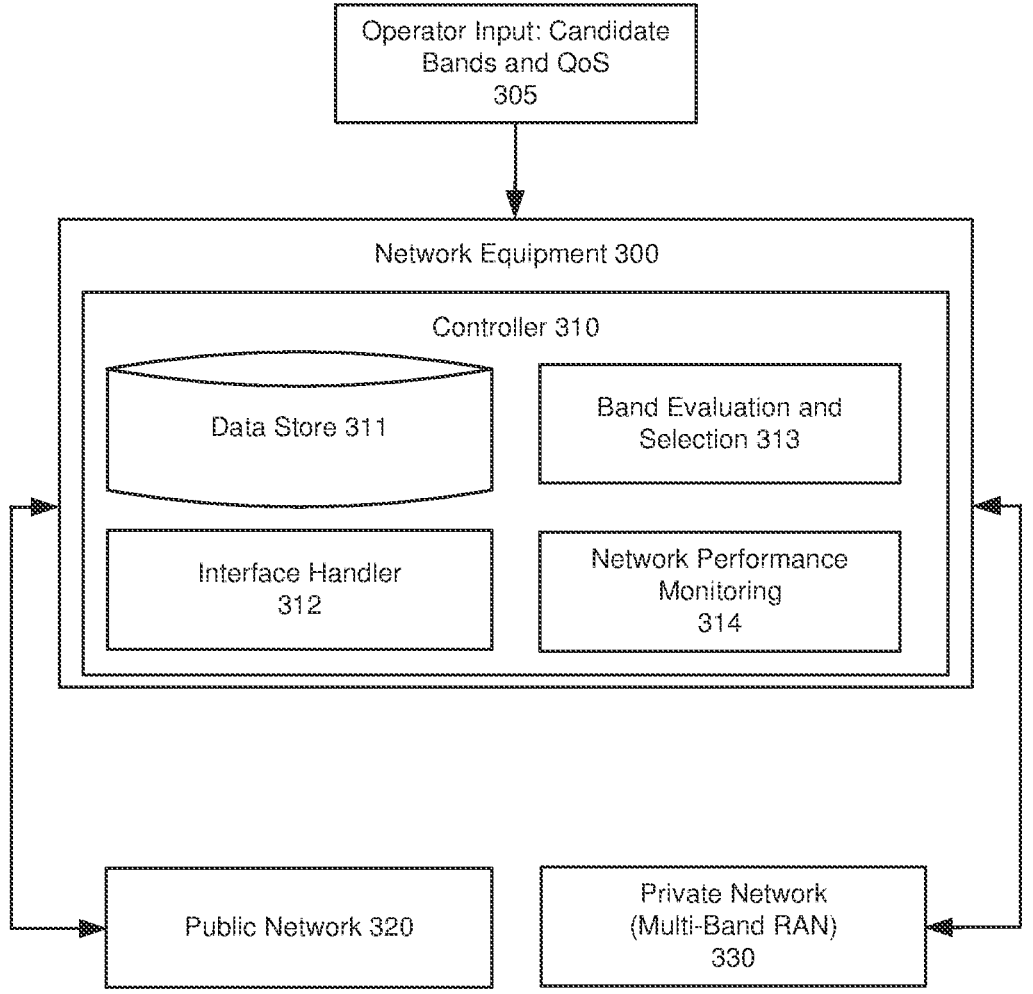
FIG. 3 illustrates an example controller architecture of a controller configured for frequency band selection, in accordance with one or more embodiments described herein.

FIG. 3 illustrates an example controller architecture of a controller configured for frequency band selection, in accordance with one or more embodiments described herein. FIG. 3 includes network equipment 300 comprising a controller 310, a public network 320, a private network 330 equipped with a multi-band RAN, and an operator input 305 to the controller 310, the operator input 305 comprising, e.g., candidate bands and QoS specifications. The controller 310 comprises a data store 311, an interface handler 312, band evaluation and selection 313, and network performance monitoring 314.

In some embodiments, the network equipment 300 can be deployed as part of a private cellular network, e.g., the private network 330. Furthermore, the private network 330 can implement, e.g., the private cellular network 100 introduced in FIG. 1. In some embodiments, the network equipment 300 can be deployed within the public network 320 or in a cloud accessible by the private network 330, so that the network equipment 300, and, more particularly, the controller 310 can be used to select frequency bands for use by the private network 330.

In some embodiments, the controller 310 can be connected to both the public network's and the private network's service management and orchestration (SMO) layers to collect therefrom key performance indicators (KPIs), target values, and lists of candidate bands and their characteristics. The controller 310 can be configured to use collected data to make spectrum allocation decisions for the private network 330. The controller 310 can communicate spectrum allocation decisions to private network's 330 RAN network functions, either directly or via the private network's 330 SMO.

The interface handler 312 can be configured to allow the controller 310 to exchange data with RAN nodes, network equipment of the public network 320 and the private network 330, and an operator such as a network operator/designer. The data store 311 can comprise a memory used to store input data 305 from the operator, as well as data from the private network 330 and the public network 320. The data store 311 can furthermore store a history of network performance information and band selection decisions, in order to improve future band selection. The network performance monitoring 314 can collect and evaluate the KPIs from RAN nodes of both the public network 320 and the private network 330. The band evaluation and selection 313 can be configured to host evaluation and selection criteria for candidate bands, and to apply a process, e.g., according to FIG. 4, to evaluate and select bands for use by the private network 330.

Figure 4:
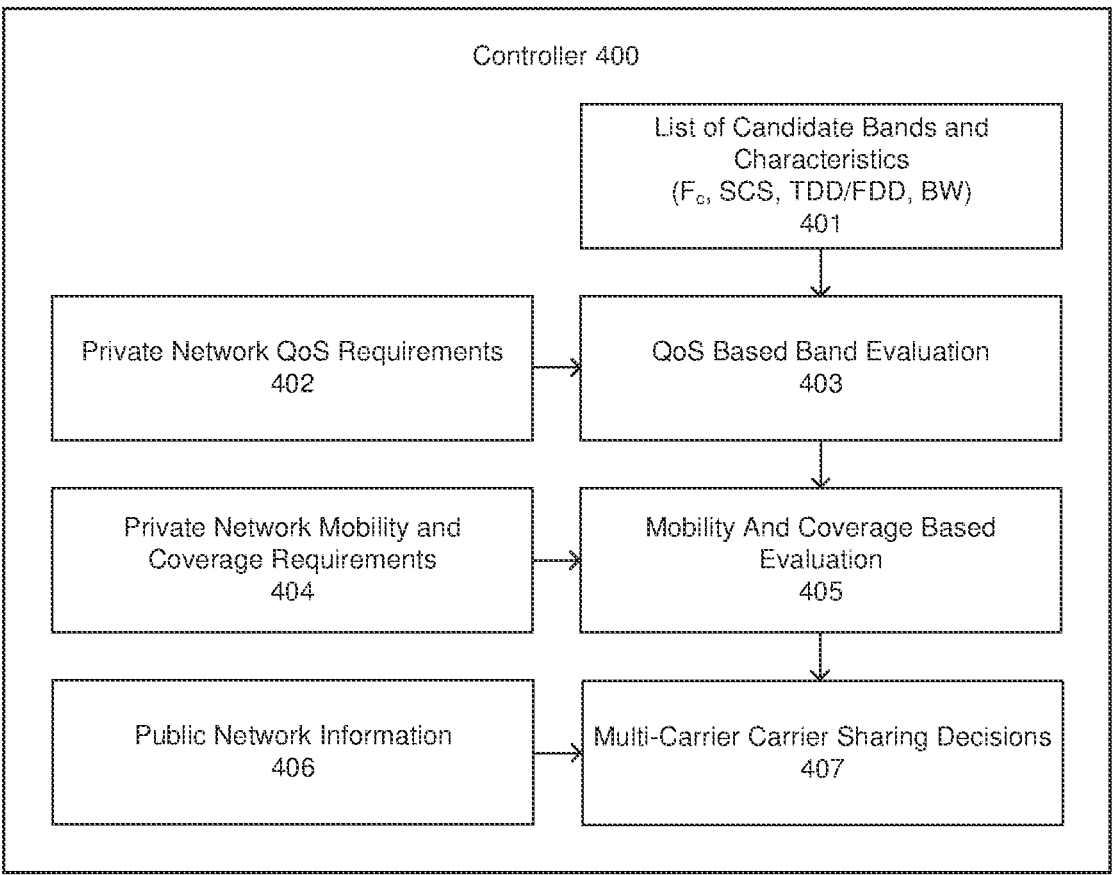
FIG. 4 illustrates example operations that can be performed by a controller configured for frequency band selection, in accordance with one or more embodiments described herein.

FIG. 4 illustrates example operations that can be performed by a controller configured for frequency band selection, in accordance with one or more embodiments described herein. FIG. 4 includes a controller 400 which can implement, e.g., the controller 310 introduced in FIG. 3. The controller 400 can be configured to use the illustrated data to carry out the illustrated operations. FIG. 4 includes, "List of Candidate Bands and Characteristics ($F_c$, SCS, TDD/FDD, BW)" 401, "Private Network QoS Requirements" 402, "QoS Based Band Evaluation" 403, "Private Network Mobility and Coverage Requirements" 404, "Mobility And Coverage Based Evaluation" 405, "Public Network Information" 406, and "Multi-Carrier Carrier Sharing Decisions" 407.

The inputs illustrated in FIG. 4 can comprise the list of candidate bands and their characteristics 401, including center frequency (Fc), subcarrier spacing (SCS), bandwidth (BW) and duplex type (FDD or TDD) for each candidate band. The inputs can further comprise private network QoS requirements 402 such as maximum delay or minimum bitrate requirements for a private network 330. The inputs can further comprise private network mobility and coverage requirements 404, wherein example coverage requirements can include minimum reference signal received power (RSRP) or minimum reference signal received quality (RSRQ) levels, and wherein example mobility requirements can include specifications regarding number of handovers and their handover success rate. The inputs can further comprise public network information 406 such as identifications of public networks, bands available for shared use with the public networks, and resource use of such bands by the public networks.

At operation 403, "QoS-based Band Evaluation," the controller 400 can be configured to estimate the QoS level of each candidate band. The controller 400 can use numerical computations/simulations, e.g., computing packet delay using SCS of each band/carrier.

At operation 405, "Mobility and Coverage-Based Evaluation," the controller 400 can be configured to estimate the coverage of each candidate band. The controller 400 can use, e.g., empirical pathloss models using band center frequency.

At operation 407, "Multi-Carrier Carrier Sharing Decisions," the controller 400 can be configured to aggregate evaluation criteria (e.g., scores) of each candidate band from operations 403 and 405, and the to select band(s) for use as a dedicated private network band, as well as a subset of bands that can be dynamically shared with the public network 320.

Figure 5:
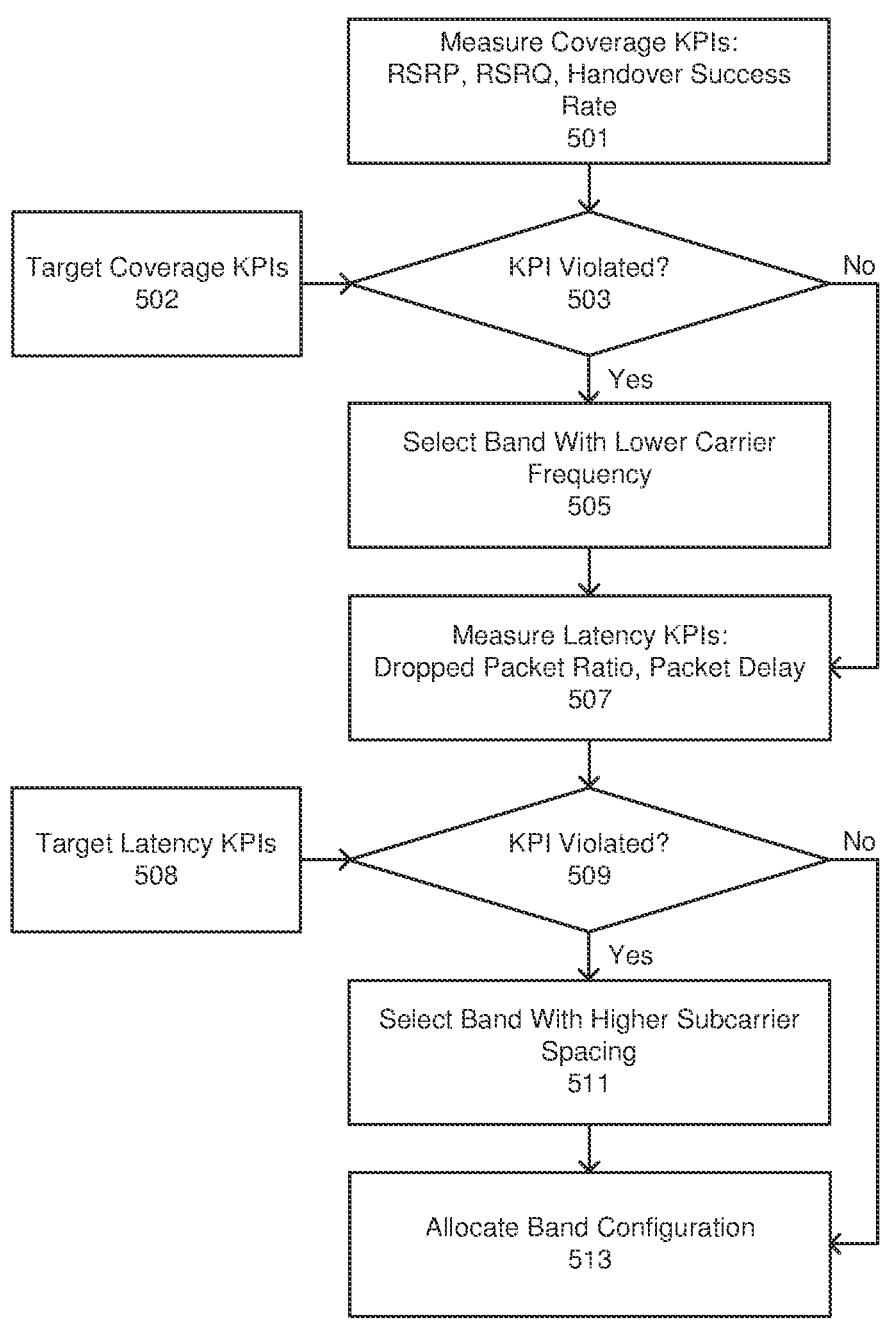
FIG. 5 is a flow diagram illustrating example operations in connection with shared multi-band selection, in accordance with one or more embodiments described herein.

FIG. 5 is a flow diagram illustrating example operations in connection with shared multi-band selection, in accordance with one or more embodiments described herein. In some embodiments, a controller 310 such as illustrated in FIG. 3 can be configured to carry out operations such as illustrated in FIG. 5. FIG. 5 includes, "Measure Coverage KPIs: RSRP, RSRQ, Handover Success Rate" 501, "Target Coverage KPIs" 502, "KPI Violated?" 503, "Select Band With Lower Carrier Frequency" 505, "Measure Latency KPIs: Dropped Packet Ratio, Packet Delay" 507, "Target Latency KPIs" 508, "KPI Violated?" 509, "Select Band With Higher Subcarrier Spacing" 511, and "Allocate Band Configuration" 513.

In an example use case, according to FIG. 5, the objectives can be, e.g., to ensure seamless mobility and connectivity by avoiding coverage holes, and to ensure a bounded latency for private network users. The primary decision criteria can include, e.g., selecting a band with a lower carrier frequency if a coverage KPI is violated, and selecting a band with a higher subcarrier spacing if a latency requirement is violated. Assumptions can include, e.g., first, a band can either be shared between the private and public network, or dedicated to the private network, and second, sharing can be done through an allocation of physical resource blocks (PRBs) to the private network.

At operation 501, coverage KPIs (RSRP, RSRQ, and handover success rate) can be collected. Coverage KPIs may be referred to as $K_c$. Operation 503 can compare the collected coverage KPIs ($K_c$) to target coverage KPIs 502, and if $K_c$ does not satisfy the target coverage KPIs 502, then operation 505 can select a band with a lower carrier frequency. Example logic to implement operations 503 and 505 can comprise:

```
IF K_c is lower than a target value set by the operator,
THEN a band with lower center frequency (better coverage) is selected.
ENDIF
```

An example process for selecting a band with a lower carrier frequency, at operation 505, is set forth below.

```
DEFINE: Set B as: all bands (not assigned to private network) sorted ascendingly according
to
their center frequency
DEFINE: x and y are two spectrum utilization thresholds; and x < y
FOR each band b ∈ B
    U_b': band b utilization
    M: maximum utilization of band b
    IF U_b' < x
        Offload users of band b to another band
        Allocate band b to the private network
    ELSEIF U_b' < y
        Share band b between private and public network
        Allocate spectrum: U_b = M – U_b' to the private network
    ENDIF
ENDFOR
```

If, at operation 503, $K_c$ does satisfy the target coverage KPI, or otherwise, after selecting a band with a lower carrier frequency at operation 505, the process can next perform operation 507. At operation 507, latency KPIs (e.g., packet delay) can be collected. Latency KPIs can be referred to as $K_d$. Operation 509 can compare the collected latency KPIs ($K_d$) to target latency KPIs 508, and if $K_d$ does not satisfy the target latency KPIs 508, then operation 511 can select a band with a higher subcarrier spacing. Example logic to implement operations 509 and 511 can comprise:

```
IF K_d is higher than a target value set by the operator,
THEN a band with higher subcarrier spacing is selected to achieve lower delay.
ENDIF
```

To select a band with a higher subcarrier spacing, a band having a shorter transmission time interval (TTI) can optionally be selected. An example process for selecting a band with a higher subcarrier spacing, at operation 511, is set forth below.

```
DEFINE: Set B as: all bands (not assigned to private network) sorted in descending order
according to their subcarrier spacing
DEFINE: w and z are two delay thresholds; and z < w
DEFINE: P_b and P_p as the priority of public and private network users, respectively
FOR each band b ∈ B
    D_b': band b average packet delay
    IF D_b' < z // low delay and can afford sharing
        Share band b between private and public network
    ELSEIF D_b' < w // high delay cannot be shared
        IF P_b < P_p
            Allocate band b to private network
        ENDIF
    ENDIF
ENDFOR
```

If, at operation 509, $K_d$ does satisfy the target latency KPI, or otherwise, after selecting a band with higher subcarrier spacing at operation 511, the process can next perform operation 513, allocate band configuration. The band configuration that is allocated at operation 513 can comprise a band selected according to operations 501-511.

In some embodiments, the disclosed techniques can beneficially satisfy heterogenous performance requirements in vertical industries served by private 5G networks. Bands with complementary characteristics can be selected to overcome the limitations of a single band, thus avoiding costly densification of radio units. Furthermore, deployment and operational costs can be reduced by dynamically sharing multiple bands with public networks based on the real-time QoS needs of applications and aggregated groups of applications.

FIG. 6 is a flow diagram of a first example, non-limiting computer implemented method for selecting multiple radio frequency bands for use by a cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 6 can be performed by network equipment 300 comprising a controller 310 such as illustrated in FIG. 3. The network equipment 300 and controller 310 can optionally be included in network equipment of a first cellular communication network, e.g., a private cellular communication network 330. The method of FIG. 6 can select and allocate radio frequency bands for dedicated use by the first cellular communication network 330, while also selecting and allocating shared radio frequency bands to be shared between the first cellular communication network 330 and a second cellular communication network, e.g., a public communication network 320.

Operation 602 comprises performing, by network equipment 300 comprising a processor, respective quality of service evaluations of respective radio frequency bands. The respective radio frequency bands can comprise bands available for use via a first cellular communication network 330. The respective radio frequency bands can comprise respective characteristics such as respective center band frequencies, respective subcarrier spacings, respective bandwidths, and respective duplex types.

In some embodiments, the respective quality of service evaluations performed according to operation 602 can result in respective estimated quality of service levels associated with the respective radio frequency bands. A respective quality of service evaluation can utilize a quality of service specification (e.g., a QoS requirement), the quality of service specification comprising, e.g., a maximum delay value or a minimum bitrate value. For example, an estimated QoS of a respective radio frequency band can be compared to a target QoS.

Operation 604 comprises performing, by the network equipment 300, respective coverage evaluations of the respective radio frequency bands. The respective coverage evaluations can result in respective estimated coverage measurements associated with the respective radio frequency bands. A respective coverage evaluation of the respective coverage evaluations can utilize a coverage specification. The coverage specification can comprise, e.g., a minimum reference signal receive power (RSRP) value or a minimum reference signal receive quality (RSRQ) value. An estimated coverage measurement associated with a respective radio frequency band can be compared to a coverage specification or requirement. In some embodiments, the respective coverage evaluations can generate respective estimated coverage measurements using an empirical pathloss model. The empirical pathloss model can be determined based on, e.g., respective center band frequencies of the respective radio frequency bands.

Operation 606 comprises performing, by the network equipment 300, respective mobility evaluations of the respective radio frequency bands. The respective mobility evaluations can result in respective estimated mobility measurements associated with the respective radio frequency bands. A respective mobility evaluation of the respective mobility evaluations can utilize a mobility specification or requirement, such as a number of handovers or a handover success rate. An estimated mobility measurement associated with a respective radio frequency band can be compared to the mobility specification or requirement.

Operation 608 comprises selecting, by the network equipment 300, based on the respective estimated quality of service levels, the respective estimated coverage measurements, and/or the respective estimated mobility measurements, a first radio frequency band of the respective radio frequency bands. For example, a first radio frequency band that satisfies quality of service specification, the estimated coverage specification, and/or the mobility specification, as determined via operations 602, 604, and 606, can be selected. Operation 610 comprises allocating, by the network equipment 300, the first radio frequency band for dedicated use via the first cellular communication network 330. Operation 612 comprises allocating, by the network equipment 300, a second radio frequency band of the respective radio frequency bands for shared use via the first cellular communication network 330 and a second cellular communication network 320.

FIG. 7 is a flow diagram of a second example, non-limiting computer implemented method for selecting multiple radio frequency bands for use by a cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by network equipment 300 comprising a controller 310 such as illustrated in FIG. 3. As described above with regard to FIG. 6, the network equipment 300 and controller 310 can optionally be included in network equipment of a first cellular communication network, e.g., a private cellular communication network 330. The method of FIG. 7 can select and allocate radio frequency bands for dedicated use by the first cellular communication network 330, while also selecting and allocating shared radio frequency bands to be shared between the first cellular communication network 330 and a second cellular communication network, e.g., a public communication network 320.

Operation 702 comprises performing a coverage evaluation of a first radio frequency band. The first radio frequency band can comprise a band that is available for use via a first cellular communication network 330. The coverage evaluation can comprise, e.g., comparing a coverage performance indicator (e.g., a coverage KPI) associated with the first radio frequency band to a target coverage performance indicator, e.g., a target coverage KPI. The coverage performance indicator can comprise, e.g., at least one of a reference signal receive power (RSRP), a reference signal receive quality (RSRQ), or a handover success rate. If the coverage performance indicator satisfies the target, the method can proceed to operation 706. Otherwise, the method can proceed to operation 704.

Operation 704 can comprise evaluating a lower frequency radio frequency band in response to the coverage performance indicator not satisfying the target coverage performance indicator at operation 702. The lower frequency radio frequency band can have a lower frequency than the first radio frequency band. If the lower frequency band satisfies the target, then the method can use the lower frequency band as the first frequency band and proceed to operation 706. Otherwise, operation 704 can be repeated.

Operation 706 comprises performing a latency evaluation of the first radio frequency band. The "first" radio frequency band can comprise a band evaluated pursuant to operation 702 or operation 704. The latency evaluation can comprise comparing a latency performance indicator (e.g., a latency KPI) associated with the first radio frequency band to a target latency performance indicator (e.g., a target latency KPI). The latency performance indicator can comprise, e.g., a dropped packet ratio and/or a packet delay value. If the latency performance indicator satisfies the target, the method can proceed to operation 710. Otherwise, the method can proceed to operation 708.

Operation 708 can comprise evaluating a higher subcarrier spacing frequency radio frequency band in response to the latency performance indicator not satisfying the target latency performance indicator at operation 706. The higher subcarrier spacing frequency radio frequency band can have a higher subcarrier spacing frequency than the first radio frequency band evaluated at operation 706. If the higher subcarrier spacing frequency band satisfies the target, then the method can use the higher subcarrier spacing frequency band as the first frequency band and proceed to operation 710. Otherwise, operation 708 can be repeated.

Operation 710 comprises, in response to the coverage performance indicator satisfying the target coverage performance indicator and the latency performance indicator satisfying the target latency performance indicator, allocating the first radio frequency band for dedicated use via the first cellular communication network 330, wherein a second radio frequency band is allocated for shared use via the first cellular communication network 330 and a second cellular communication network 320. In operation 710, "first" radio frequency band can comprise a band evaluated pursuant to operation 702, 704, 706 and/or 708.

In some embodiments, the second radio frequency band can be selected to have complementary characteristics with reference to the first radio frequency band. For example, in if the first radio frequency band is a high-band frequency, then the second radio frequency band can comprise a mid- or low-band frequency, and vice versa. The specific complementary frequency selected as the second radio frequency band can be based in part on a geographic distribution of UEs that communicate via the first cellular communication network 330, as well as the application or device specific requirements, such as QoS and mobility requirements, of the UEs.

FIG. 8 is a flow diagram of a third example, non-limiting computer implemented method for selecting multiple radio frequency bands for use by a cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by network equipment 300 comprising a controller 310 such as illustrated in FIG. 3. As described above with regard to FIG. 6, the network equipment 300 and controller 310 can optionally be included in network equipment of a first cellular communication network, e.g., a private cellular communication network 330. The method of FIG. 8 can select and allocate radio frequency bands for dedicated use by the first cellular communication network 330, while also selecting and allocating shared radio frequency bands to be shared between the first cellular communication network 330 and a second cellular communication network, e.g., a public communication network 320.

Operation 802 comprises performing a quality of service evaluation of a first radio frequency band. The first radio frequency band can be one that is available for use via a private cellular communication network 330. The quality of service evaluation can result in an estimated quality of service level associated with the first radio frequency band.

Operation 804 comprises performing a coverage evaluation of the first radio frequency band. The coverage evaluation can result in an estimated coverage measurement associated with the first radio frequency band. In some embodiments, the coverage evaluation can generate the estimated coverage measurement using a pathloss based on a center band frequency of the first radio frequency band.

Operation 806 comprises performing a mobility evaluation of the first radio frequency band. The mobility evaluation can result in an estimated mobility measurement.

Operation 808 comprises, in response to the estimated quality of service level satisfying a quality of service requirement, the estimated coverage measurement satisfying a coverage requirement, and/or the estimated mobility measurement satisfying a mobility requirement, allocating the first radio frequency band for dedicated use via the private cellular communication network 330, wherein a second radio frequency band is allocated for shared use via the private cellular communication network 330 and a public cellular communication network 320. The quality of service requirement can comprise, e.g., a maximum delay requirement or a minimum bitrate requirement. The coverage requirement can comprise, e.g., a minimum reference signal receive power (RSRP) requirement or a minimum reference signal receive quality (RSRQ) requirement. The mobility requirement can comprise, e.g., a number of handovers or a handover success rate.

Figure 9:
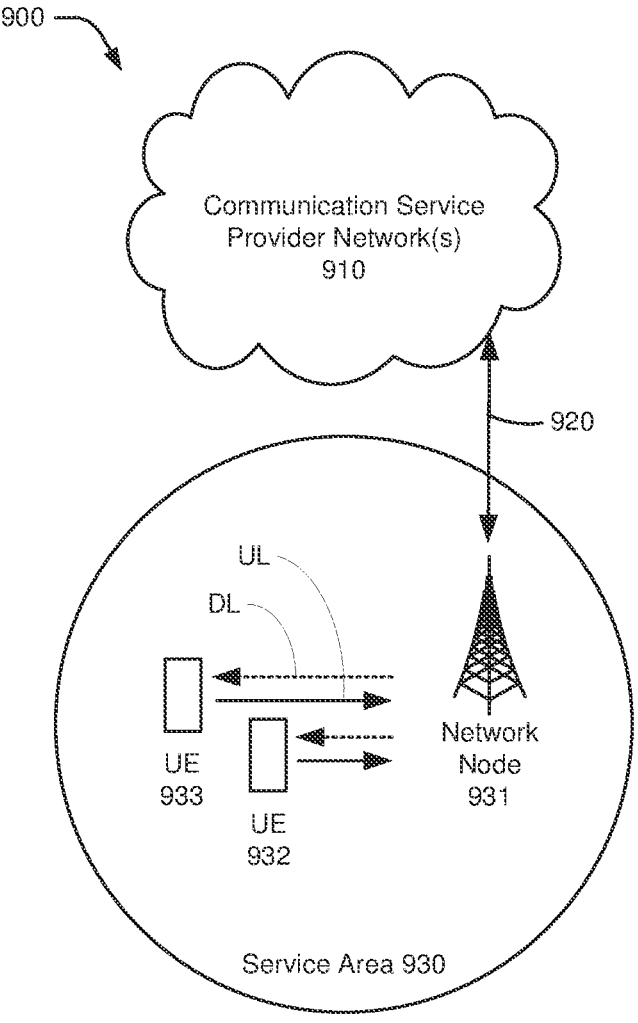
FIG. 9 illustrates an example wireless communication system, in accordance with one or more embodiments described herein.

FIG. 9 illustrates an example wireless communication system 900, in accordance with one or more embodiments described herein. The example wireless communication system 900 comprises communication service provider network(s) 910, a network node 931, and user equipment (UEs) 932, 933. A backhaul link 920 connects the communication service provider network(s) 910 and the network node 931. The network node 931 can communicate with UEs 932, 933 within its service area 930. The dashed arrow lines from the network node 931 to the UEs 932, 933 represent downlink (DL) communications to the UEs 932, 933. The solid arrow lines from the UEs 932, 933 to the network node 931 represent uplink (UL) communications.

In general, with reference to FIG. 9, the non-limiting term "user equipment" can refer to any type of device that can communicate with network node 931 in a cellular or mobile communication system 900. UEs 932, 933 can have one or more antenna panels having vertical and horizontal elements. Examples of UEs 932, 933 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 932, 933 can also comprise IOT devices that communicate wirelessly.

In various embodiments, system 900 comprises communication service provider network(s) 910 serviced by one or more wireless communication network providers. Communication service provider network(s) 910 can comprise a "core network". In example embodiments, UEs 932, 933 can be communicatively coupled to the communication service provider network(s) 910 via a network node 931. The network node 931 can communicate with UEs 932, 933, thus providing connectivity between the UEs 932, 933 and the wider cellular network. The UEs 932, 933 can send transmission type recommendation data to the network node 931.

The transmission type recommendation data can comprise a recommendation to transmit data via a closed loop multiple input multiple output (MIMO) mode and/or a rank-1 precoder mode.

Network node 931 can have a cabinet and other protected enclosures, computing devices, an antenna mast, and multiple antennas for performing various transmission operations (e.g., MIMO operations) and for directing/steering signal beams. Network node 931 can comprise one or more base station devices which implement features of the network node. Network nodes can serve several cells, depending on the configuration and type of antenna. In example embodiments, UEs 932, 933 can send and/or receive communication data via wireless links to the network node 931.

Communication service provider networks 910 can facilitate providing wireless communication services to UEs 932, 933 via the network node 931 and/or various additional network devices (not shown) included in the one or more communication service provider networks 910. The one or more communication service provider networks 910 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 900 can be or comprise a large-scale wireless communication network that spans various geographic areas. According to this implementation, the one or more communication service provider networks 910 can be or comprise the wireless communication network and/or various additional devices and components of the wireless communication network (e.g., additional network devices and cell, additional UEs, network server devices, etc.).

The network node 931 can be connected to the one or more communication service provider networks 910 via one or more backhaul links 920. The one or more backhaul links 920 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 920 can also comprise wireless link components, such as but not limited to, line-of-sight (LOS) or non-LOS links which can comprise terrestrial air-interfaces or deep space links (e.g., satellite communication links for navigation). Backhaul links 920 can be implemented via a "transport network" in some embodiments. In another embodiment, network node 931 can be part of an integrated access and backhaul network. This may allow easier deployment of a dense network of self-backhauled 5G cells in a more integrated manner by building upon many of the control and data channels/procedures defined for providing access to UEs 932, 933.

Wireless communication system 900 can employ various cellular systems, technologies, and modulation modes to facilitate wireless radio communications between devices (e.g., the UEs 932, 933 and the network node 931). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 900 can operate in accordance with any 5G, next generation communication technology, or existing communication technologies, various examples of which are listed supra. In this regard, various features and functionalities of system 900 are applicable where the devices (e.g., the UEs 932, 933 and the network node 931) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 10:
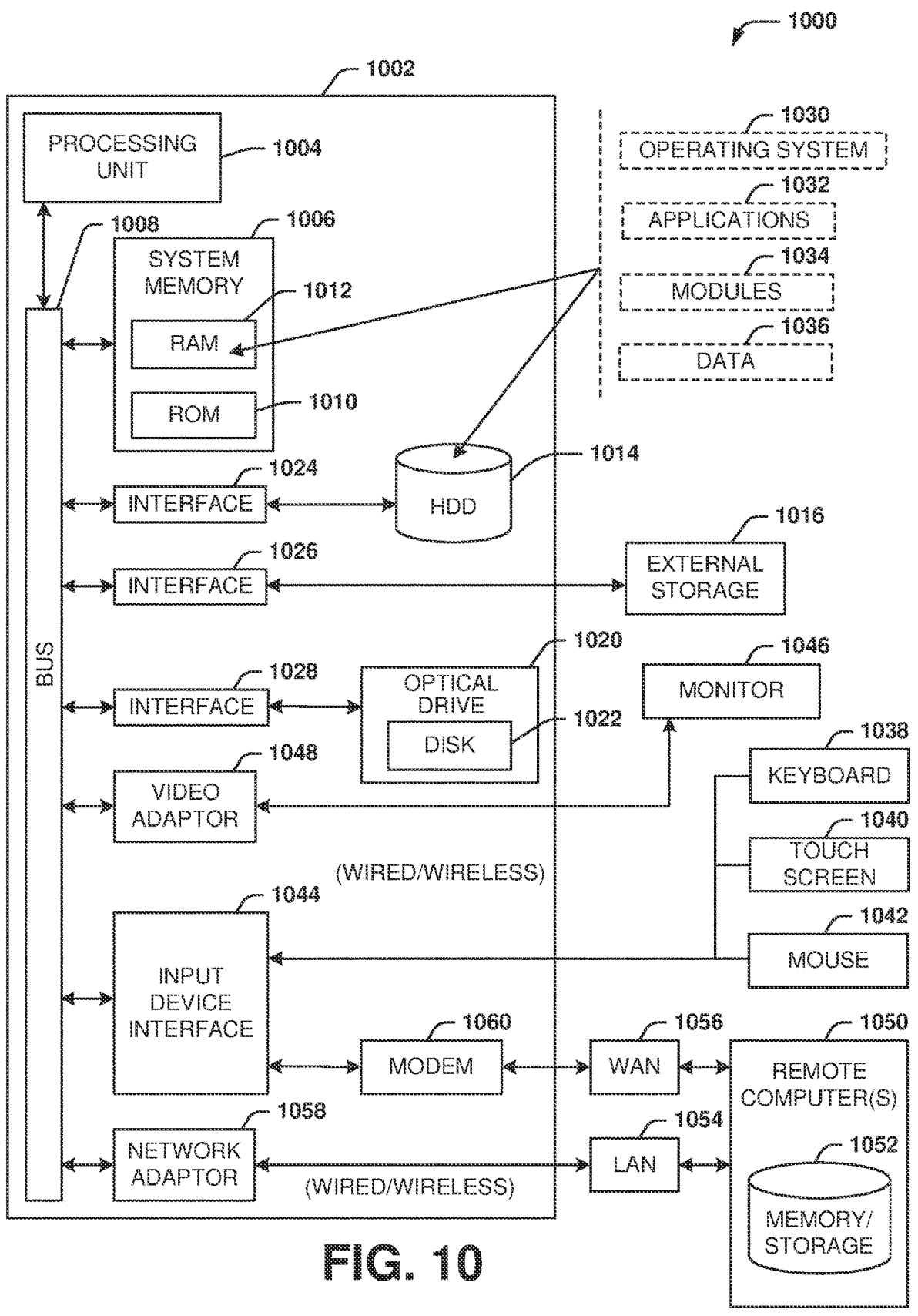
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

performing, by network equipment comprising a processor, respective quality of service evaluations of respective radio frequency bands, wherein the respective radio frequency bands are available for use via a first cellular communication network, and wherein the respective quality of service evaluations result in respective estimated quality of service levels associated with the respective radio frequency bands;

performing, by the network equipment, respective coverage evaluations of the respective radio frequency bands, wherein the respective coverage evaluations result in respective estimated coverage measurements associated with the respective radio frequency bands;

performing, by the network equipment, respective mobility evaluations of the respective radio frequency bands, wherein the respective mobility evaluations result in respective estimated mobility measurements associated with the respective radio frequency bands;

selecting, by the network equipment, based on the respective estimated quality of service levels, the respective estimated mobility measurements, and the respective estimated coverage measurements, a first radio frequency band of the respective radio frequency bands;

allocating, by the network equipment, the first radio frequency band for dedicated use via the first cellular communication network; and allocating, by the network equipment, a second radio frequency band of the respective radio frequency bands for shared use via the first cellular communication network and a second cellular communication network.

2. The method of claim 1, wherein the first cellular communication network comprises a private cellular communication network, and wherein the second cellular communication network comprises a public communication network.

3. The method of claim 1, wherein a respective quality of service evaluation of the respective quality of service evaluations utilizes a quality of service specification, the quality of service specification comprising a maximum delay value or a minimum bitrate value.

4. The method of claim 1, wherein a respective coverage evaluation of the respective coverage evaluations utilizes a coverage specification, the coverage specification comprising a minimum reference signal receive power value or a minimum reference signal receive quality value.

5. The method of claim 1, wherein the respective coverage evaluations generate the respective estimated coverage measurements using an empirical pathloss model, and wherein the empirical pathloss model is determined based on respective center band frequencies of the respective radio frequency bands.

6. The method of claim 1, wherein a respective mobility evaluation of the respective mobility evaluations utilizes a mobility specification, the mobility specification comprising a number of handovers or a handover success rate.

7. The method of claim 1, wherein the respective radio frequency bands comprise respective center band frequencies, respective subcarrier spacings, respective bandwidths, and respective duplex types.

8. Network equipment, comprising:

a processor; and a memory that stores executable instructions that, when executed by the processor, facilitate performance of operations, comprising:

performing a coverage evaluation of a first radio frequency band, wherein the first radio frequency band is available for use via a first cellular communication network, and wherein the coverage evaluation comprises comparing a coverage performance indicator associated with the first radio frequency band to a target coverage performance indicator;

performing a latency evaluation of the first radio frequency band, wherein the latency evaluation comprises comparing a latency performance indicator associated with the first radio frequency band to a target latency performance indicator; and in response to the coverage performance indicator satisfying the target coverage performance indicator and the latency performance indicator satisfying the target latency performance indicator, allocating the first radio frequency band for dedicated use via the first cellular communication network, wherein a second radio frequency band is allocated for shared use via the first cellular communication network and a second cellular communication network.

9. The network equipment of claim 8, wherein the operations further comprise evaluating a lower frequency radio frequency band in response to the coverage performance indicator not satisfying the target coverage performance indicator, the lower frequency radio frequency band having a lower frequency than the first radio frequency band.

10. The network equipment of claim 8, wherein operations further comprise evaluating a higher subcarrier spacing frequency radio frequency band in response to the latency performance indicator not satisfying the target latency performance indicator, the higher subcarrier spacing frequency radio frequency band having a higher subcarrier spacing than the first radio frequency band.

11. The network equipment of claim 8, wherein the coverage performance indicator comprises at least one of a reference signal receive power, a reference signal receive quality, or a handover success rate.

12. The network equipment of claim 8, wherein the latency performance indicator comprises at least one of a dropped packet ratio or a packet delay value.

13. The network equipment of claim 8, wherein the first cellular communication network comprises a private cellular network, and wherein the second cellular communication network comprises a public network.

14. A non-transitory machine-readable medium, comprising executable instructions that, when executed by a processor, facilitate performance of operations, comprising:

performing a quality of service evaluation of a first radio frequency band, wherein the first radio frequency band is available for use via a private cellular communication network, and wherein the quality of service evaluation results in an estimated quality of service level associated with the first radio frequency band;

performing a coverage evaluation of the first radio frequency band, wherein the coverage evaluation results in an estimated coverage measurement associated with the first radio frequency band;

performing a mobility evaluation of the first radio frequency band, wherein the mobility evaluation results in an estimated mobility measurement; and in response to the estimated quality of service level satisfying a quality of service requirement, the estimated mobility measurement satisfying a mobility requirement, and the estimated coverage measurement satisfying a coverage requirement, allocating the first radio frequency band for dedicated use via the private cellular communication network, wherein a second radio frequency band is allocated for shared use via the private cellular communication network and a public cellular communication network.

15. The non-transitory machine-readable medium of claim 14, wherein the quality of service requirement comprises a maximum delay requirement or a minimum bitrate requirement.

16. The non-transitory machine-readable medium of claim 14, wherein the coverage requirement comprises a minimum reference signal receive power requirement or a minimum reference signal receive quality requirement.

17. The non-transitory machine-readable medium of claim 14, wherein the coverage evaluation generates the estimated coverage measurement using a pathloss based on a center band frequency of the first radio frequency band.

18. The non-transitory machine-readable medium of claim 14, wherein the mobility requirement comprises a number of handovers or a handover success rate.

19. The non-transitory machine-readable medium of claim 14, wherein the first radio frequency band comprises a center band frequency.

20. The non-transitory machine-readable medium of claim 14, wherein the first radio frequency band comprises at least one of a defined subcarrier spacing or a defined duplex type.

\* \* \* \* \*